US012668083B2

(12) United States Patent
Cressman et al.

(10) Patent No.: US 12,668,083 B2
(45) Date of Patent: Jun. 30, 2026

(54) TIRE WITH MULTIPLE STEEL BELTS AND A REINFORCEMENT LAYER

(71) Applicant: Bridgestone Americas Tire Operations, LLC, Nashville, TN (US)

(72) Inventors: Mark H. Cressman, North Canton, OH (US); Michael A. Bianco, Cuyahoga Falls, OH (US); Omar R. Cuata, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/273,693

(22) PCT Filed: Jan. 24, 2022

(86) PCT No.: PCT/US2022/070300
§ 371 (c)(1),
(2) Date: Jul. 21, 2023

(87) PCT Pub. No.: WO2022/178474
PCT Pub. Date: Aug. 25, 2022

(65) Prior Publication Data
US 2024/0116315 A1 Apr. 11, 2024

Related U.S. Application Data

(60) Provisional application No. 63/151,126, filed on Feb. 19, 2021.

(51) Int. Cl.
B60C 9/18 (2006.01)
B60C 9/20 (2006.01)
B60C 9/22 (2006.01)

(52) U.S. Cl.
CPC ............ B60C 9/1835 (2013.01); B60C 9/185 (2013.01); B60C 9/2006 (2013.01);
(Continued)

(58) Field of Classification Search
CPC .................. B60C 9/1835; B60C 9/185; B60C 2009/1857; B60C 2009/1864;
(Continued)

(56) References Cited

U.S. PATENT DOCUMENTS 5,435,369 A * 7/1995 Yap ......................... B60C 9/185
152/526
6,321,808 B1 11/2001 Spragg et al.
(Continued)

FOREIGN PATENT DOCUMENTS

DE 102006029898 1/2008
DE 102006029898 A1 * 1/2008 ............. B60C 9/185
(Continued)

OTHER PUBLICATIONS

Supplementary European Search Report; Corresponding EP Application No. 22757147; 2024-11-13.24.
(Continued)

*Primary Examiner* — Katelyn W Smith
*Assistant Examiner* — Thomas Frank Schneider

(57) ABSTRACT

A tire includes a pair of annular beads, a body ply extending between the pair of annular beads, and at least three steel belt layers disposed above the body ply and extending axially across a portion of the body ply. The tire further includes at least one reinforcement layer disposed above the at least three steel belt layers, a circumferential tread disposed above the at least one reinforcement layer and extending axially across the tire, and a pair of sidewalls extending between each of the pair of annular beads and a pair of shoulders associated with the circumferential tread.

11 Claims, 6 Drawing Sheets

(52) U.S. Cl.
  CPC ................. *B60C 2009/1857* (2013.01); *B60C 2009/2038* (2013.01); *B60C 2009/2219* (2013.01); *B60C 2200/06* (2013.01)

(58) Field of Classification Search
  CPC ........ B60C 2200/06; B60C 2009/2038; B60C 2009/2219; B60C 2009/2214
  See application file for complete search history.

(56) References Cited

U.S. PATENT DOCUMENTS

| | | | |
|---|---|---|---|
| 7,252,129 | B2 | 8/2007 | Michiels et al. |
| 7,874,335 | B2 | 1/2011 | Michiels et al. |
| 7,931,062 | B2 | 4/2011 | Michiels et al. |
| 8,006,733 | B2 | 8/2011 | Michiels et al. |
| 8,083,877 | B2 | 12/2011 | Michiels et al. |
| 9,163,127 | B2 | 10/2015 | Weingart et al. |
| 9,199,416 | B2 | 12/2015 | Ayyildiz |
| 9,556,351 | B2 | 1/2017 | Weingart et al. |
| 10,046,603 | B2 | 8/2018 | Aksoy et al. |
| 10,208,407 | B2 | 2/2019 | Fidan et al. |
| 2001/0017179 | A1* | 8/2001 | Tsuruta ..................... B60C 9/22 152/531 |
| 2004/0018262 | A1 | 1/2004 | Reep et al. |
| 2006/0185778 | A1 | 8/2006 | Michiels et al. |
| 2009/0114330 | A1 | 5/2009 | Netzer et al. |
| 2011/0220263 | A1 | 9/2011 | Michiels |
| 2012/0207957 | A1 | 8/2012 | Michiels |
| 2012/0211139 | A1 | 8/2012 | Li |
| 2012/0214372 | A1 | 8/2012 | Li |
| 2014/0116596 | A1 | 5/2014 | Michiels et al. |
| 2015/0107744 | A1 | 4/2015 | Michiels et al. |
| 2015/0183271 | A1* | 7/2015 | Kawagoe .................. B60C 9/02 156/123 |
| 2016/0200146 | A1 | 7/2016 | Lee |
| 2016/0297245 | A1 | 10/2016 | Fidan et al. |
| 2017/0072747 | A1 | 3/2017 | Aksoy et al. |
| 2017/0136822 | A1 | 5/2017 | Takita |
| 2017/0151837 | A1* | 6/2017 | Gehres ..................... B60C 9/22 |
| 2018/0178596 | A1 | 6/2018 | Kirby et al. |
| 2018/0186185 | A1 | 7/2018 | Fidan et al. |
| 2018/0258563 | A1 | 9/2018 | Fidan et al. |
| 2018/0272802 | A1 | 9/2018 | Ito et al. |
| 2018/0333989 | A1 | 11/2018 | Fidan |
| 2018/0339554 | A1 | 11/2018 | Fidan |
| 2019/0023076 | A1* | 1/2019 | Tauchi .................. B60C 11/005 |
| 2019/0275838 | A1* | 9/2019 | Sasaki ................... D07B 1/162 |

FOREIGN PATENT DOCUMENTS

| | | | | |
|---|---|---|---|---|
| DE | 102015223929 A1 * | 6/2017 | .......... B60C 9/1835 |
| EP | 0687581 A2 * | 12/1995 | .......... B60C 9/2204 |
| EP | 3967517 | 3/2022 | |
| JP | 2005041396 | 2/2005 | |
| JP | 2005041396 A * | 2/2005 | |
| JP | 2005104437 A * | 4/2005 | .............. B60C 9/28 |
| JP | 2008273454 | 11/2008 | |
| JP | 2008273454 A * | 11/2008 | |
| KR | 1020150138894 | 12/2015 | |

OTHER PUBLICATIONS

International Search Report & Written Opinion; Corresponding PCT Application No. PCT/US2022/070300; Authorized Officer Hwang, Chan Yoon; May 10, 2022.

* cited by examiner

100

110

105

TIRE WITH MULTIPLE STEEL BELTS AND A REINFORCEMENT LAYER

FIELD OF INVENTION

This disclosure relates to tires having multiple belts and at least one reinforcement layer in a crown region. More particularly, this disclosure relates to tires having at least three steel belts and at least one reinforcement layer in a crown region.

BACKGROUND

Current tire constructions employ body plies having reinforcement cords that extend transversely from bead to bead. Such tires are referred to as radial tires, because the reinforcement cords are in a substantially radial orientation. A radial tire employs at least one inextensible, circumferential belt that contains steel reinforcement cords. The belt is disposed in a crown region of the tire, above the body plies and below the tread. A circumferential tread is disposed above the belt.

Tires for passenger cars, light trucks, SUVs, mini-vans, and other such vehicles are known to include a single circumferential belt or two circumferential belts. In some instances, such tires may further include one or more nylon cap plies wrapped circumferentially about the belts. The cap plies restrict the amount of growth due to the centrifugal load on the tire. In other instances, such tires may have shoulder reinforcement layers. Such shoulder layers constrain the belt endings, thereby restricting belt edge movement and preventing crack growth.

Tires for larger applications, such as for large trucks and busses, are known to include three or more circumferential steel belts. The addition of a third and/or fourth belt increases the load capacity of such tires. Unlike tires for passenger cars, light trucks, etc., such tires do not include cap plies or shoulder layers. It has been generally understood in the art that the addition of a third belt, and even a fourth belt, not only increases load capacity, but also provides an additional benefit of restricting the amount of growth due to centrifugal load on the tire, thus making cap plies or shoulder layers unnecessary. Moreover, cap plies and shoulder layers are known to add weight to a tire and to increase the tire assembly construction cycle, thereby increasing the cost. Because cap plies and shoulder layers were understood to provide little or no benefit to tires having three or more circumferential belts, and because cap plies and shoulder layers were understood to add weight and cost to the tires, they have not been used in such tires.

SUMMARY OF THE INVENTION

In one embodiment, a tire has a crown region with a first shoulder region at a first end of the crown region and a second shoulder region at a second end of the crown region. The tire also has a pair of bead regions, including a first bead region and a second bead region. The tire further has a first sidewall region extending from the first bead region to the first shoulder region and a second sidewall region extending from the second bead region to the second shoulder region. The tire includes at least three circumferential belts disposed in the crown region. The tire further includes a first shoulder layer located in the first shoulder region and disposed above the at least three circumferential belts. The first shoulder layer has a first outer end located outside a first end of at least two of the at least three circumferential belts and a first inner end located inside the first end of each of the at least three circumferential belts. The tire also includes a second shoulder layer located in the second shoulder region and disposed above the at least three circumferential belts. The second shoulder layer has a second outer end located outside a second end of at least two of the at least three circumferential belts and a second inner end located inside the second end of each of the at least three circumferential belts.

In another embodiment, a tire includes a pair of annular beads, a body ply extending between the pair of annular beads, and at least three circumferential belts disposed above the body ply and extending axially across a portion of the body ply. The tire further includes a nylon layer disposed above the at least three circumferential belts, a circumferential tread disposed above the nylon layer and extending axially across the tire, and a pair of sidewalls extending between each of the pair of annular beads and a pair of shoulders associated with the circumferential tread.

In yet another embodiment, a tire includes a pair of annular beads, a body ply extending between the pair of annular beads, and at least three steel belt layers disposed above the body ply and extending axially across a portion of the body ply. The tire further includes at least one reinforcement layer disposed above the at least three steel belt layers, a circumferential tread disposed above the at least one reinforcement layer and extending axially across the tire, and a pair of sidewalls extending between each of the pair of annular beads and a pair of shoulders associated with the circumferential tread.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it should be understood that because the terms carry slightly different connotations, one of ordinary skill in the art would not consider any one of the following terms to be purely interchangeable with another term used to describe a common tire component.

Figure 1:
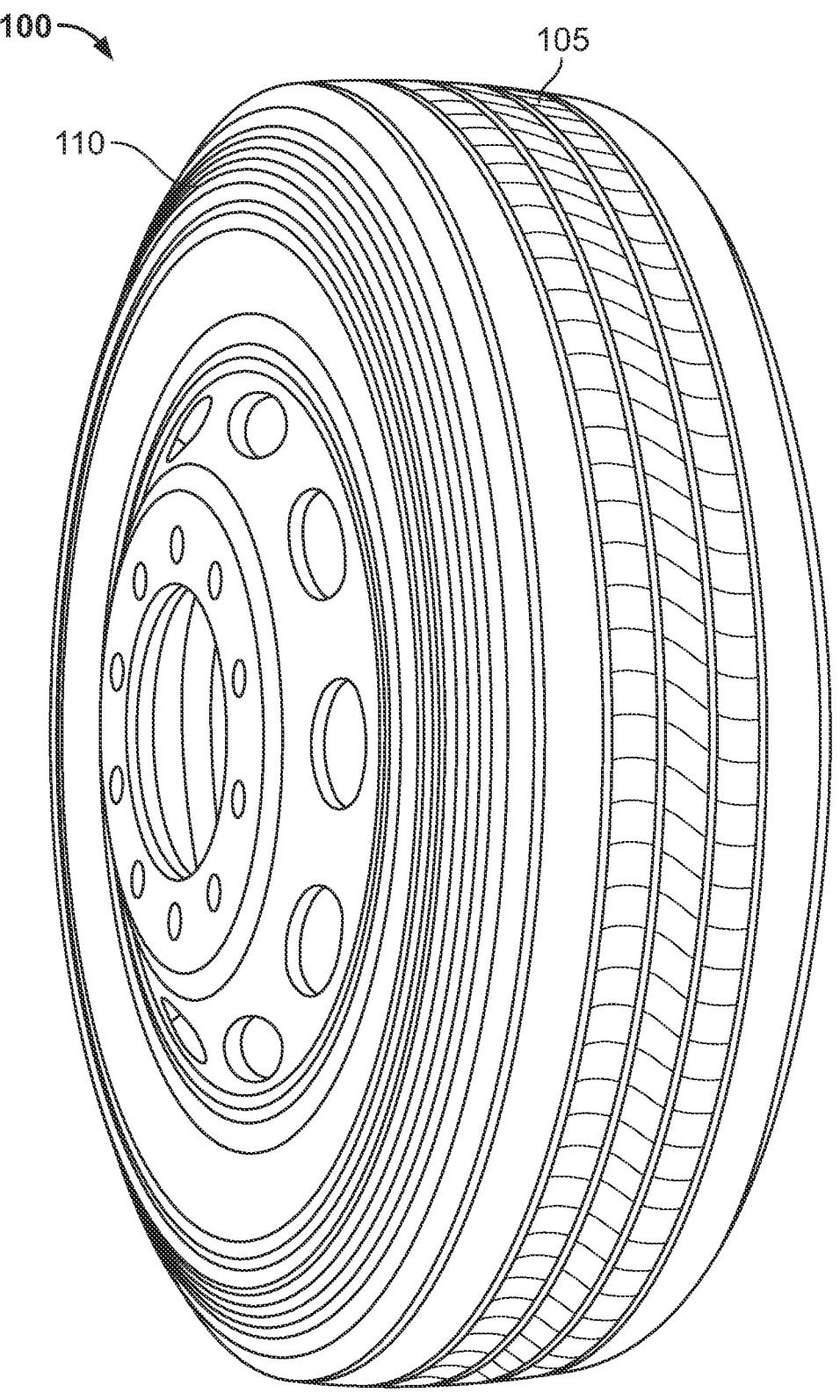
FIG. 1 is a perspective view of one embodiment of a tire.

FIG. 1 is a perspective view of one embodiment of a tire 100. The illustrated tire may be used for large applications, such as for a truck or bus. The tire 100 includes a circumferential tread 105 and a sidewall 110. In the illustrated embodiment, the tread 105 includes a plurality of circumferential grooves that define a plurality of ribs. The tread 105 further includes a plurality of lateral grooves that define a plurality of blocks. The tread 105 further includes sipes and notches in the blocks. It should be understood, however, that the illustrated tread 105 is merely exemplary and that the tread may include any tread elements.

Figure 2:
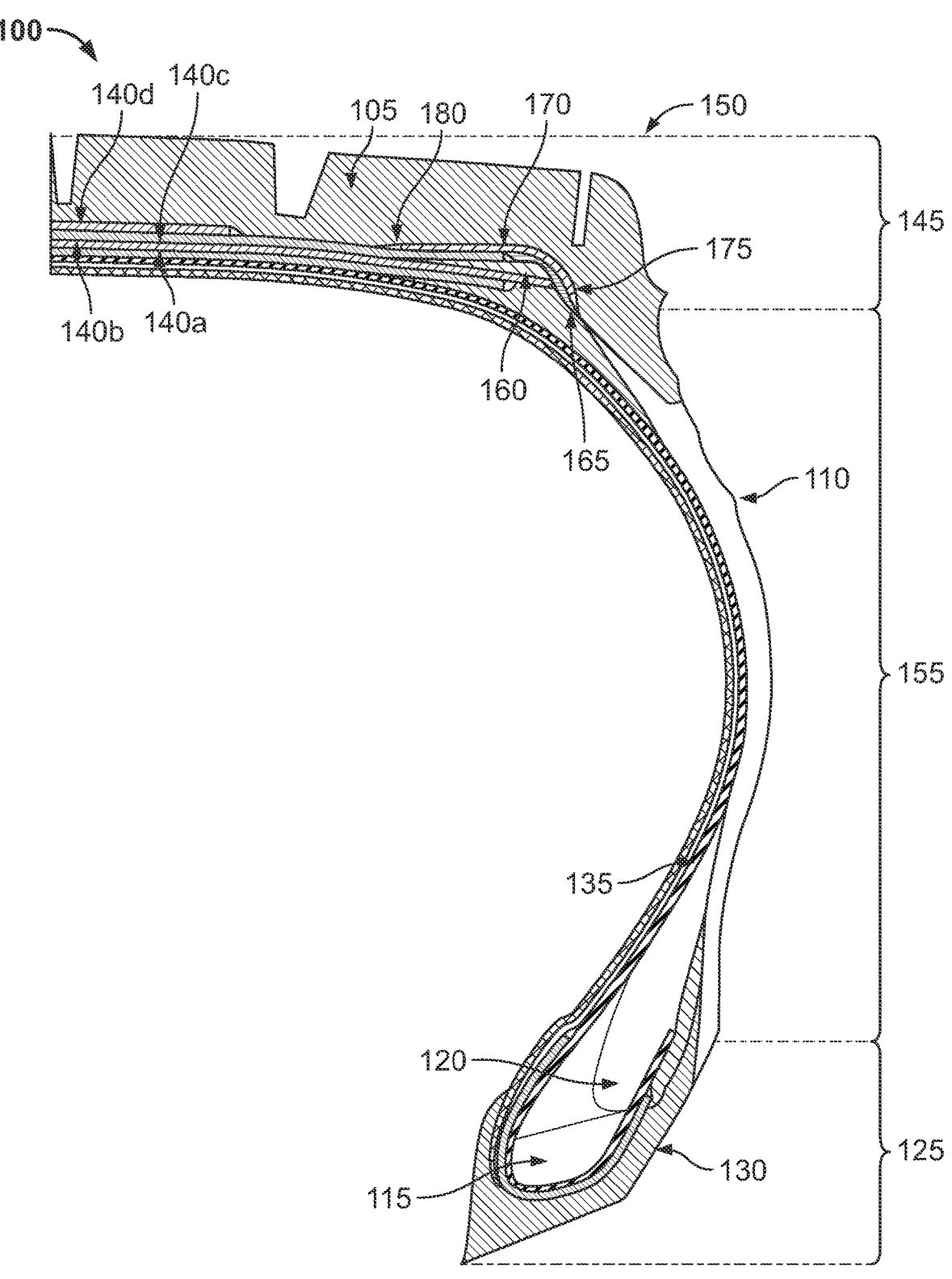
FIG. 2 is a half cross section of the tire of FIG. 1.

FIG. 2 is a half cross section of the tire 100. As can be seen in this view, the tire 100 further includes a pair of annular beads 115 (only one of which is shown in this view) and a bead filler 120 disposed above each bead. The beads 115 may be constructed of steel, while the bead fillers 120 may be constructed of an elastomeric material. The bead 115 and bead filler 120 form a bead region 125 of the tire 100. In the illustrated embodiment, the bead region 125 also includes an abrasion 130. In an alternative embodiment, two or more beads may be disposed on each side of the tire. In another alternative embodiment, the bead filler may be formed of multiple components, with each component constructed of a different material.

In the illustrated embodiment, a body ply 135 extends between, and wraps around each of the pair of annular beads 115. In the illustrated embodiment, a turn-up portion of the body ply 135 terminates in a lower portion of the tire. In alternative embodiments, the turn-up portion of the body ply may terminate at any location of the tire. It should be understood that the tire may include multiple body plies. In such embodiments, two or more of the body plies may wrap around the beads. Alternatively, one or more body plies may extend from bead to bead, without wrapping around the beads.

The tire 100 further includes four circumferential belts 140a, 140b, 140c, 140d disposed above the body ply 135 and extending axially across a portion of the body ply 135. The belts 140 may be constructed of steel or any other metal. Together, the circumferential belts 140 and the tread 105 form a crown region 145 of the tire 100. In an alternative embodiment, the tire includes three circumferential belts in the crown region instead of four belts. In another alternative embodiment, the tire includes five or more circumferential belts. In all embodiments discussed herein, it should be understood that the tire includes at least three circumferential belts in the crown region.

The tire 100 further includes a shoulder 150 at each end of the crown region 145, only one of which is shown in FIG. 2. The tire 100 further includes a pair of sidewall regions 155, with each sidewall region 155 extending from one of the shoulders 150 to a respective bead region 125.

In the illustrated embodiment, a belt wedge 160 is located in each shoulder 150, between an end of a second belt 140b and an end of a third belt 140c. The belt wedge 160 is constructed of rubber or other elastomeric material, to protect the edges of the belts 140 and prevent abrasion. While a single belt wedge 160 is shown in the illustrated shoulder 150 between the second and third belts 140b,c, it should be understood that the location may be selected as needed, and multiple belt wedges may be employed. Alternatively, the belt wedge may be omitted.

A gum strip 165 is also located in each shoulder 150, above the ends of the second and third belts 140b,c. The gum strip 165 further protects the edges of the belts 140 and prevents abrasion. While a single gum strip 165 is shown in the illustrated shoulder 150 above the second and third belts 140b,c, it should be understood that the location may be selected as needed, and multiple gum strips may be employed. Alternatively, the gum strip may be omitted.

In the illustrated embodiment, the tire 100 includes a shoulder layer 170 located in each shoulder region 150 and disposed above three of the circumferential belts 140a,b,c. The shoulder layer 170 has an outer end 175 located outside a first end of each of the three circumferential belts 140a,b,c. In this embodiment the outer end 175 of the shoulder layer 170 is located outside the first end of the widest belt of the tire 100 (i.e., the second belt 140b in the illustrated embodiment). In one known embodiment, the outer end 175 of the shoulder layer 170 is located 3 to 5 mm outside of the end of the second belt 140b. The shoulder layer 170 also has an inner end 180 located inside the first end of each of the at least three circumferential belts 140a,b,c. Such a shoulder layer may be referred to as a "full" shoulder layer.

It should be understood that the opposite side of the tire 100 has substantially the same construction, and thus includes a second shoulder layer that is similarly disposed. Thus, the shoulder layer 170 shown in FIG. 2 may be described as a first shoulder layer. For brevity, the second shoulder layer is not described in detail.

In one embodiment the first shoulder layer 170 and the second shoulder layer are each constructed of steel. In alternative embodiments, the shoulder layers 170 may be constructed of other metal or fiberglass. In another alternative embodiment, the shoulder layers 170 are each constructed of nylon. In still other alternative embodiments, the shoulder layers 170 may be constructed of polyester, rayon, or other such material.

When constructing the tire 100, tension is applied to the shoulder layers 170 as they are wrapped circumferentially about the shoulder 150. The shoulder layers 170 are thus under tension when the tire 100 is not in contact with the ground. The pre-tensioned shoulder layers 170 restrict the amount of growth in the shoulder 150 due to the centrifugal load on the tire 100, and thus even the distribution of growth in the crown region throughout the life of the tire 100.

In one embodiment, the shoulder layers 170 are each made by winding a strip of material about a shoulder region of the tire 100, so that the shoulder layers 170 extend circumferentially about the tire 100, and perpendicular to the reinforcements of the body ply 135. In one particular embodiment, each shoulder layer is formed by a thin strip of material that is spirally wrapped about the tire multiple times.

It has long been understood in the art that reinforcement layers are not needed in the crown region of tires constructed with three or more circumferential belts. Recent experiments and observations, however, have shown results that are contrary to such widely held expectations. In fact, over a long period of use, the ends of the steel belts may move or even flip upwards. Such movement of the belt ends can cause cracks to grow in the tire, decrease the durability of the tire, and lead to irregular wear. Prolonged driving at higher speeds (as may occur when speed limits are increased) may exacerbate such belt end movement.

Experiments have shown that, contrary to previous expectations, the use of shoulder layers 170 in a crown region 150 of a tire 100 help control shoulder growth and also mitigate the effects of heat generation. The shoulder layers 170 thus evenly distribute the energy in the tire 100 and reduce irregular wear. This reduction of irregular wear helps to prolong the life of the tire 100, even after multiple retread operations. It has been found that the benefits of the shoulder layers 170 outweigh the added costs.

Figure 3:
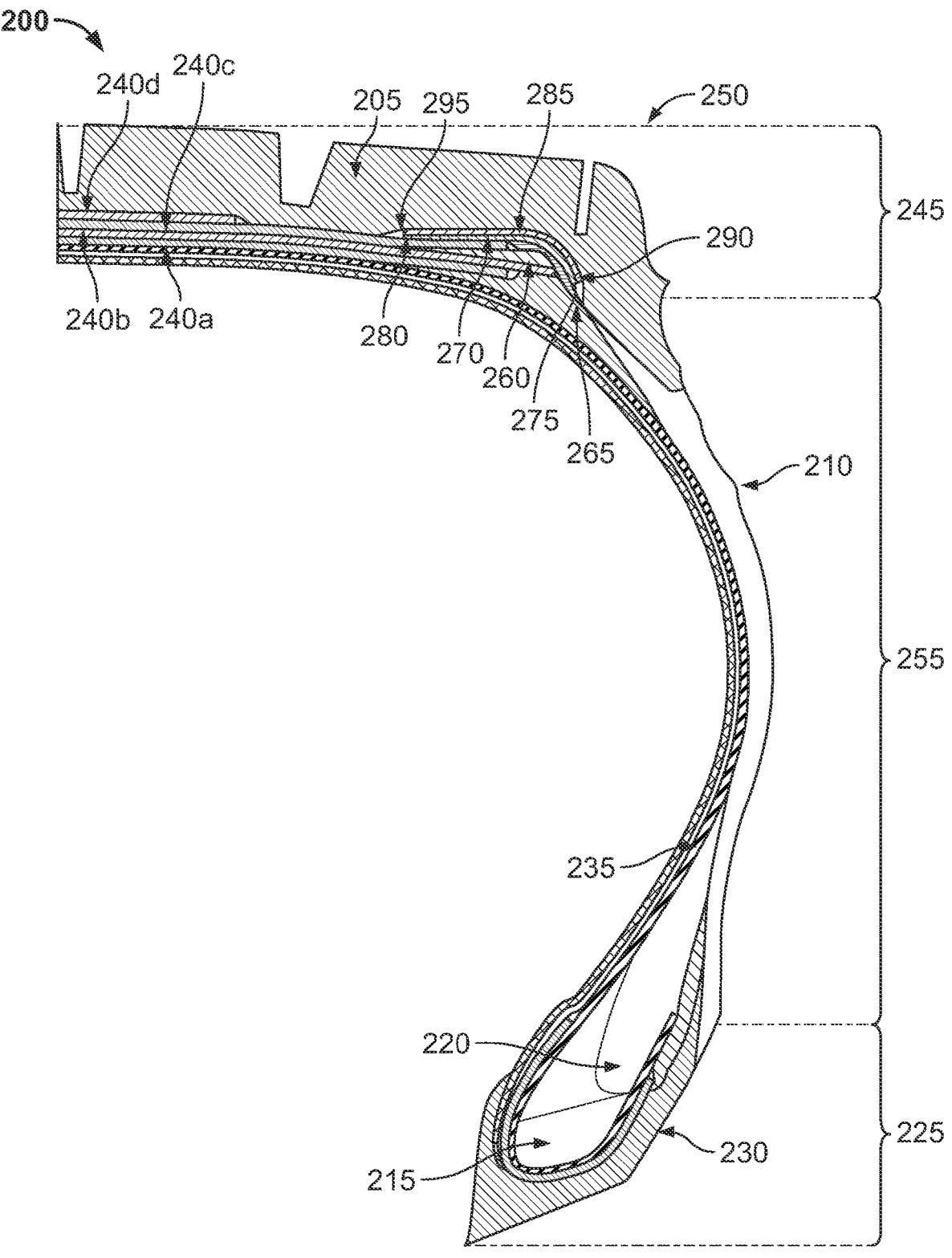
FIG. 3 is a half cross section of an alternative embodiment of a tire.
Figure 4:
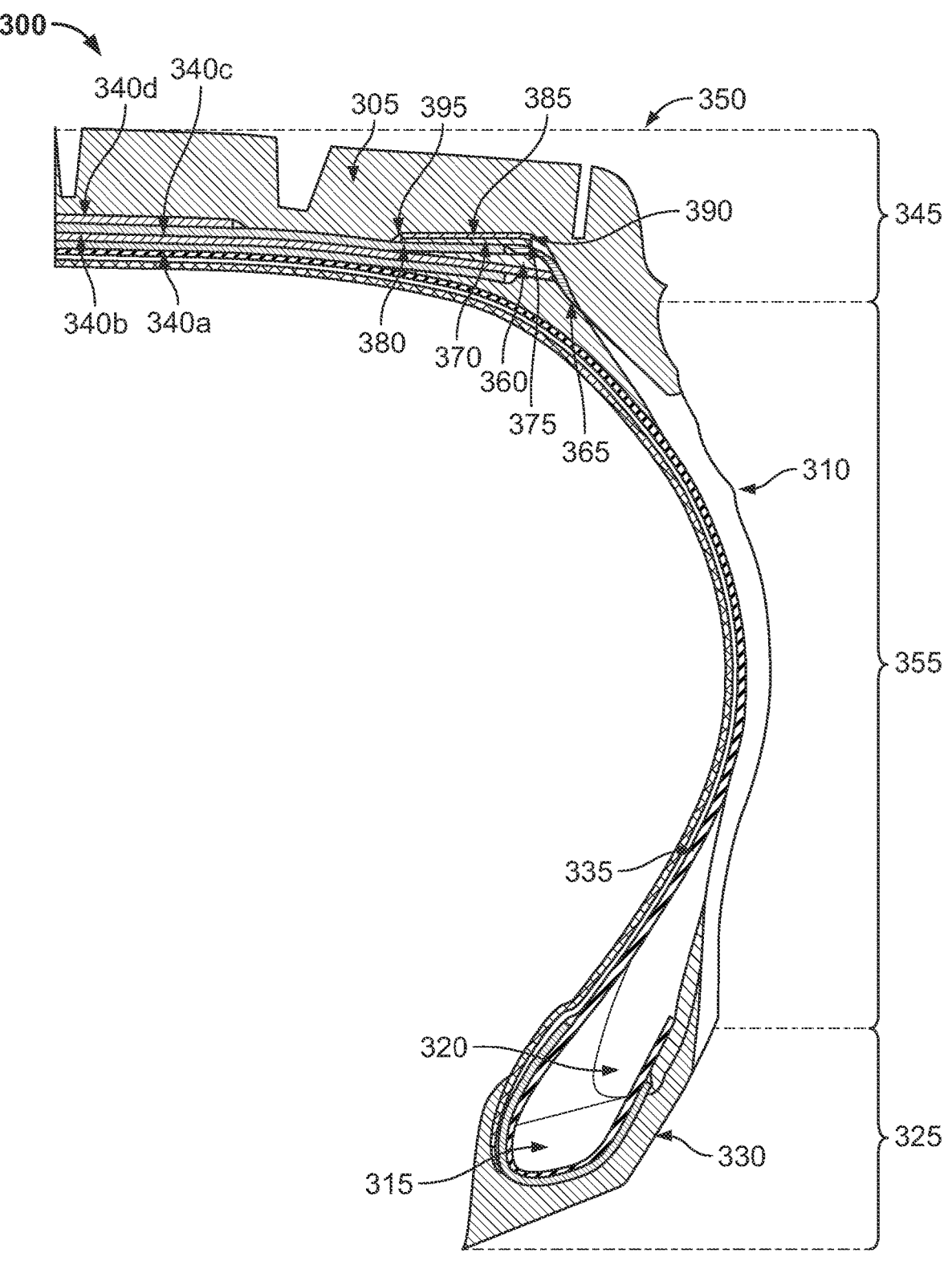
FIG. 4 is a half cross section of another alternative embodiment of a tire.

Other embodiments, such as those shown in FIGS. 3 and 4, have been shown to provide similar, unexpected benefits. For brevity, these benefits are not re-stated for each embodiment.

FIG. 3 is a half cross section of an alternative embodiment of a tire 200. The tire 200 of FIG. 3 is substantially similar to the tire 100 of FIGS. 1 and 2, except for the differences described herein. Accordingly, like features will be identified by like numerals increased by a value of "100." The construction of the bead region 225 and sidewall region 255 of tire 200 is substantially the same as that of the tire 100, and is therefore not repeated. The alternative embodiments described with respect to tire 100 may also be applied to tire 200.

The tire 200 includes four circumferential belts 240a, 240b, 240c, 240d in the crown region 245, disposed above the body ply 235 and extending axially across a portion of the body ply 235. The belts 240 may be constructed of steel or any other metal.

The tire 200 further includes a shoulder 250 at each end of the crown region 245, only one of which is shown in FIG. 3. A belt wedge 260 is located in each shoulder 250, between an end of a second belt 240b and an end of a third belt 240c. A gum strip 265 is also located in each shoulder 250, above the ends of the second and third belts 240b,c.

In the illustrated embodiment, the tire 200 includes a lower shoulder layer 270 located in the each shoulder region 250 and disposed above three of the circumferential belts 240a,b,c. The lower shoulder layer 270 has an outer end 275 located outside a first end of each of the three circumferential belts 240a,b,c. In this embodiment, the outer end 275 of the lower shoulder layer 270 is located outside the first end of the widest belt (i.e., the second belt 240b in the illustrated embodiment). In one known embodiment, the outer end 275 of the lower shoulder layer 270 is located 3 to 5 mm outside of the end of the second belt 240b. The lower shoulder layer 270 also has an inner end 280 located inside the first end of each of the at least three circumferential belts 240a,b,c. Such a lower shoulder layer may be referred to as a "full" lower shoulder layer.

The tire 200 further includes an upper shoulder layer 285 disposed above the lower shoulder layer 270. Like the lower shoulder layer 270, the upper shoulder layer 285 has an outer end 290 located outside a first end of each of the three circumferential belts 240a,b,c. In one known embodiment, the outer end 290 of the upper shoulder layer 285 is located 3 to 5 mm outside of the end of the second belt 240b. The upper shoulder layer 285 also has an inner end 295 located inside the first end of each of the at least three circumferential belts 240a,b,c. Such an upper shoulder layer may be referred to as a "full" upper shoulder layer.

In the illustrated embodiment, the lower shoulder layer 270 and the upper shoulder layer 285 have substantially the same width and the ends are aligned. In an alternative embodiment, the upper shoulder layer is offset from the lower shoulder layer such that the ends are not aligned. In another alternative embodiment, the lower shoulder layer may be wider than the upper shoulder layer. In yet another alternative embodiment, the upper shoulder layer may be wider than the lower shoulder layer.

It should be understood that the opposite side of the tire 200 has substantially the same construction, and thus includes second upper and lower shoulder layers that are similarly disposed.

In one embodiment the shoulder layers 270,285 are each constructed of steel. In alternative embodiments, the shoulder layers 270,285 may be constructed of other metal or fiberglass. In another alternative embodiment, the shoulder layers 270,285 are each constructed of nylon. In still other alternative embodiments, the shoulder layers 270,285 may be constructed of polyester, rayon, or other such material.

The shoulder layers 270,285 are pre-tensioned during a tire build, in the same manner described above with respect to tire 100. In one embodiment, the shoulder layers 270,285 are each made by winding a strip of material about a shoulder region of the tire 200, so that the shoulder layers 270,285 extend circumferentially about the tire 200, and perpendicular to the reinforcements of the body ply 235. In one particular embodiment, each shoulder layer is formed by a thin strip of material that is spirally wrapped about the tire multiple times.

FIG. 4 is a half cross section of an alternative embodiment of a tire 300. The tire 300 of FIG. 4 is substantially similar to the tire 100 of FIGS. 1 and 2, and the tire 200 of FIG. 3, except for the differences described herein. Accordingly, like features will be identified by like numerals increased by a value of "100." The construction of the bead region 325 and sidewall region 355 of tire 300 is substantially the same as that of the tire 100, and is therefore not repeated. The alternative embodiments described with respect to tire 100 may also be applied to tire 300.

The tire 300 includes four circumferential belts 340a, 340b, 340c, 340d in the crown region 345, disposed above the body ply 335 and extending axially across a portion of the body ply 335. The belts 340 may be constructed of steel or any other metal.

The tire 300 further includes a shoulder 350 at each end of the crown region 345, only one of which is shown in FIG. 4. A belt wedge 360 is located in each shoulder 350, between an end of a second belt 340b and an end of a third belt 340c. A gum strip 365 is also located in each shoulder 350, above the ends of the second and third belts 340b,c.

In the illustrated embodiment, the tire 300 includes a lower shoulder layer 370 located in the each shoulder region 350 and disposed above three of the circumferential belts 340a,b,c. The lower shoulder layer 370 has an outer end 375 located outside a first end of the first and third circumferential belts 340a,c, but inside a first end of the second circumferential belt 340b. The lower shoulder layer 370 also has an inner end 380 located inside the first end of each of the at least three circumferential belts 340a,b,c. Such a lower shoulder layer may be referred to as a "mid-step" lower shoulder layer.

The tire 300 further includes an upper shoulder layer 385 disposed above the lower shoulder layer 370. Like the lower shoulder layer 370, the upper shoulder layer 385 has an outer end 390 located outside a first end of each of the three circumferential belts 340a,b,c. The upper shoulder layer 385 has an outer end 390 located outside a first end of the first and third circumferential belts 340a,c, but inside a first end of the second circumferential belt 340b. The upper shoulder layer 385 also has an inner end 395 located inside the first end of each of the at least three circumferential belts 340a,b,c. Such an upper shoulder layer may be referred to as a "mid-step" upper shoulder layer.

In the illustrated embodiment, the lower shoulder layer 370 and the upper shoulder layer 385 have substantially the same width and the ends are aligned. In an alternative embodiment, the upper shoulder layer is offset from the lower shoulder layer such that the ends are not aligned. In another alternative embodiment, the lower shoulder layer may be wider than the upper shoulder layer. In yet another alternative embodiment, the upper shoulder layer may be wider than the lower shoulder layer.

It should be understood that the opposite side of the tire 300 has substantially the same construction, and thus includes second upper and lower shoulder layers that are similarly disposed.

In one embodiment the shoulder layers 370,385 are each constructed of steel. In alternative embodiments, the shoulder layers 370,385 may be constructed of other metal or fiberglass. In another alternative embodiment, the shoulder layers 370,385 are each constructed of nylon. In still other alternative embodiments, the shoulder layers 370,385 may be constructed of polyester, rayon, or other such material The shoulder layers 370,385 are pre-tensioned during a tire build, in the same manner described above with respect to tire 300. In one embodiment, the shoulder layers 370,385 are each made by winding a strip of material about a shoulder region of the tire 300, so that the shoulder layers 370,385 extend circumferentially about the tire 300, and perpendicular to the reinforcements of the body ply 335. In one particular embodiment, each shoulder layer is formed by a thin strip of material that is spirally wrapped about the tire multiple times.

Although not explicitly illustrated, it should be understood that in an alternative embodiment, a single "mid-step" shoulder layer may be employed in each shoulder of a tire. Such a single "mid-step" shoulder layer would be substantially the same as the shoulder layers 170 of tire 100, but with the dimensions of the upper and lower shoulder layers 370,385 of tire 300.

Figure 5:
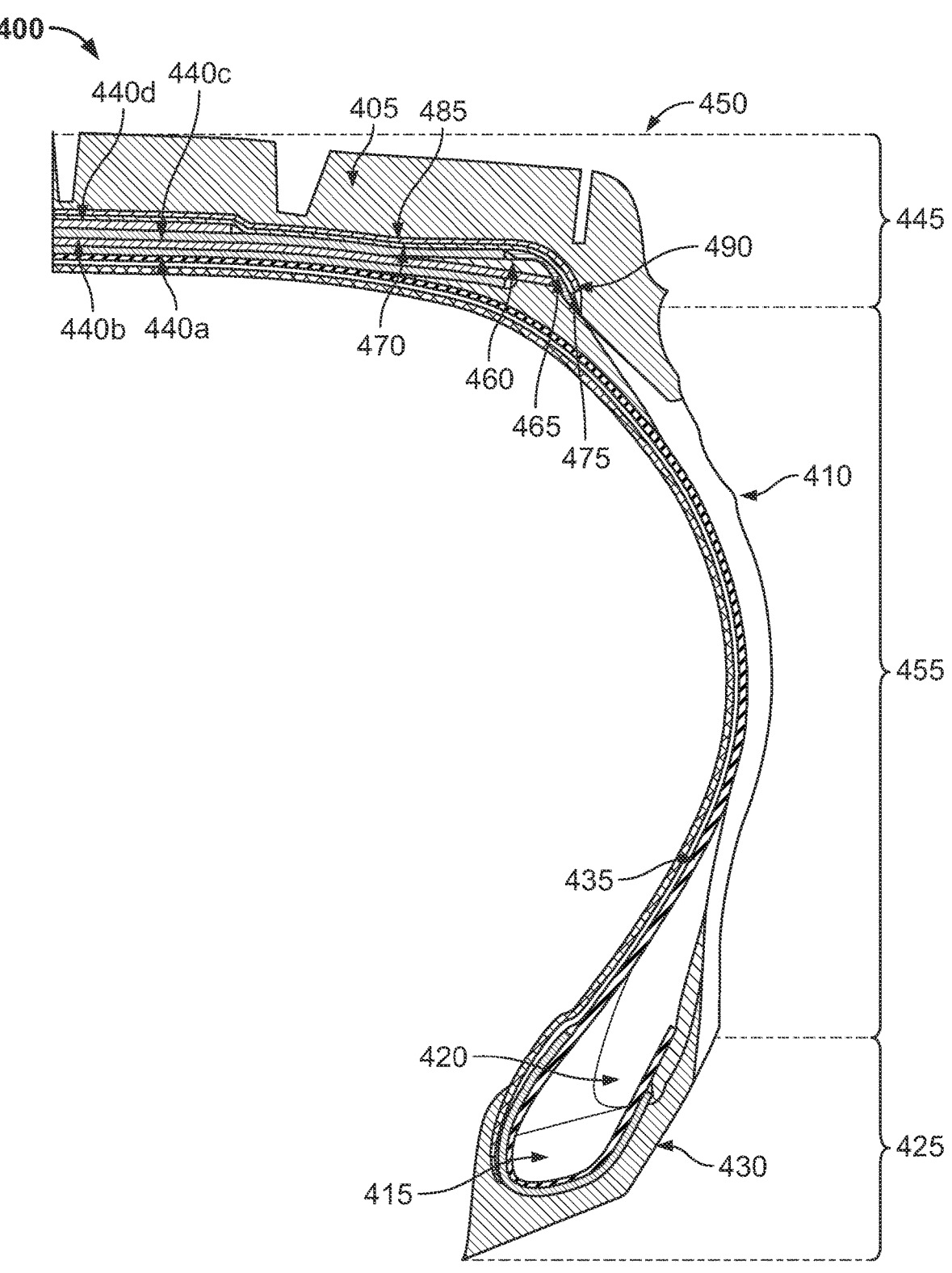
FIG. 5 is a half cross section of yet another alternative embodiment of a tire.

FIG. 5 is a half cross section of another alternative embodiment of a tire 400. The tire 400 of FIG. 5 is substantially similar to the tire 100 of FIGS. 1 and 2, the tire 200 of FIG. 3, and the tire 300 of FIG. 4, except for the differences described herein. Accordingly, like features will be identified by like numerals increased by a value of "100." The construction of the sidewall region and bead region of tire 400 is substantially the same as that of the tire 100, and is therefore not repeated. The alternative embodiments described with respect to tire 100 may also be applied to tire 400.

The tire 400 includes four circumferential belts 440a, 440b, 440c, 440d in the crown region 445, disposed above the body ply 435 and extending axially across a portion of the body ply 435. The belts 440 may be constructed of steel or any other metal.

The tire 400 further includes a shoulder 450 at each end of the crown region 445, only one of which is shown in FIG. 5. A belt wedge 460 is located in each shoulder 450, between an end of a second belt 440b and an end of a third belt 440c. A gum strip 465 is also located in each shoulder 450, above the ends of the second and third belts 440b,c.

In the illustrated embodiment, the tire 400 includes a lower cap ply 470 disposed above each of the circumferential belts 440a,b,c,d. The lower cap ply 470 has a first end 475 located outside a first end of each of the circumferential belts 440a,b,c,d. The lower cap ply 470 also has a second end (not shown in this view) located outside a second end of each of the circumferential belts 440a,b,c,d. Such a lower cap ply may be referred to as a "full" lower cap ply.

The tire 400 further includes an upper cap ply 485 disposed above the lower cap ply 470. Like the lower cap ply 470, the upper cap ply 485 has a first end 490 located outside a first end of each of the circumferential belts 440a,b,c. The upper cap ply 485 also has a second end (not shown in this view) located outside a second end of each of the circumferential belts 440a,b,c,d. Such an upper cap ply may be referred to as a "full" upper cap ply.

In the illustrated embodiment, the lower cap ply 470 and the upper cap ply 485 have substantially the same width. In an alternative embodiment, the lower cap ply may be wider than the upper cap ply. In another alternative embodiment, the upper cap ply may be wider than the lower cap ply.

In one embodiment the cap plies 470,485 are each constructed of nylon. In alternative embodiments, the cap plies 470,485 may be constructed of polyester, rayon, aramid, polyester-aramid mix, other synthetic fibers, or other such material. The cap plies 470,485 are pre-tensioned during a tire build, in the same manner described above with respect to tire 100.

It has long been understood in the art that cap plies are not needed in the crown region of tires constructed with three or more circumferential belts. Recent experiments and observations, however, have shown results that are contrary to such widely held expectations. In fact, over a long period of use, the footprints of such tires may deform due to elongation of the steel belts. Such deformation of the footprint can lead to irregular wear, and could even lead to cracking beneath the casing of the tire. Prolonged driving at higher speeds (as may occur when speed limits are increased) may exacerbate this deformation.

Experiments have shown that, contrary to previous expectations, the use of cap plies 470, 480 in a crown region 445 of a tire 400 may help control shoulder growth and also mitigate the effects of heat generation. The cap plies 470, 485 thus evenly distribute the energy in the tire 400 and reduce irregular wear. This reduction of irregular wear helps to prolong the life of the tire 400, even after multiple retread operations. It has been found that the benefits of the cap plies 470, 485 outweigh the added costs.

Figure 6:
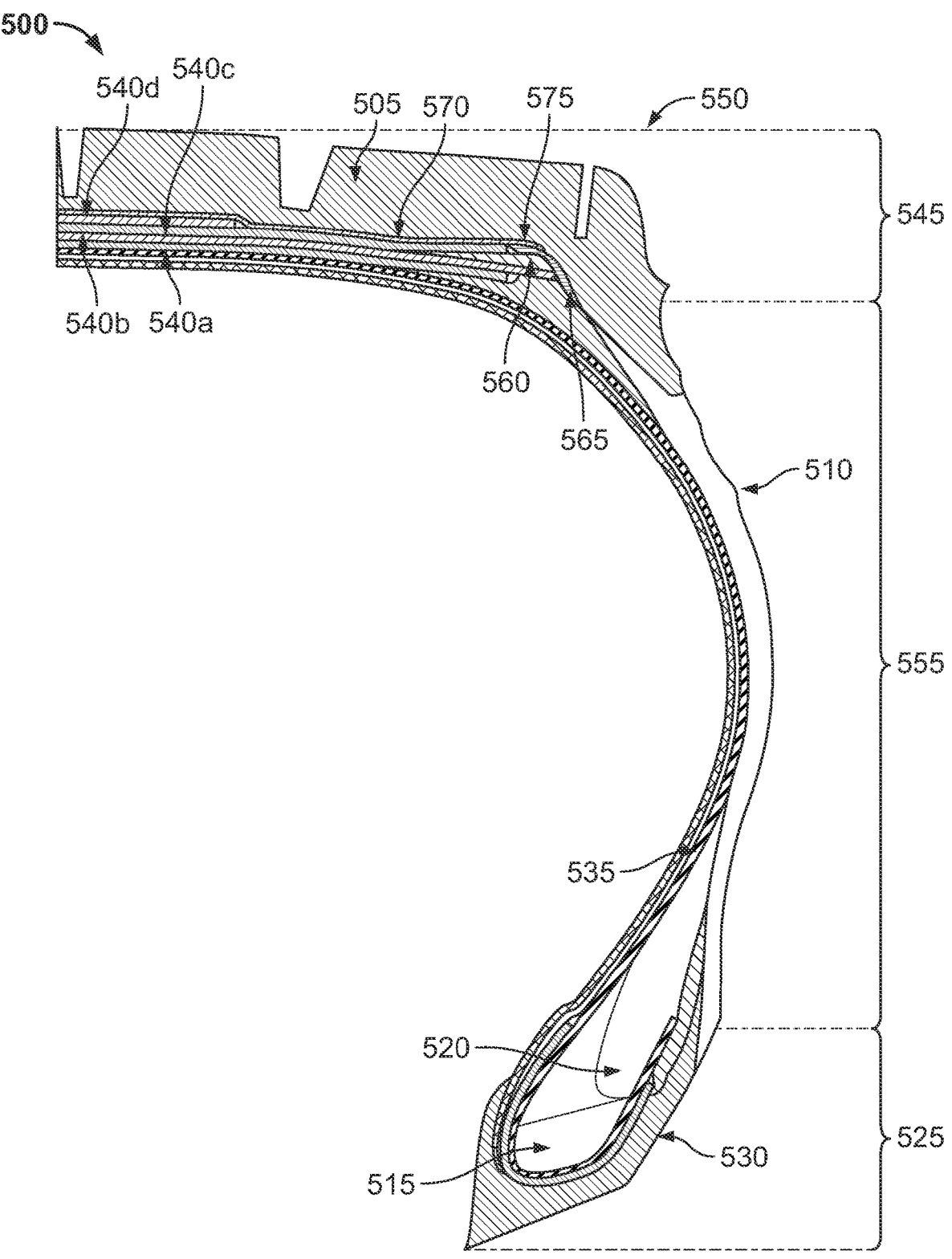
FIG. 6 is a half cross section of still another alternative embodiment of a tire.

FIG. 6 is a half cross section of another alternative embodiment of a tire 500. The tire 500 of FIG. 6 is substantially similar to the tire 100 of FIGS. 1 and 2, the tire 200 of FIG. 3, the tire 300 of FIG. 4, and the tire 400 of FIG. 5, except for the differences described herein. Accordingly, like features will be identified by like numerals increased by a value of "100." The construction of the sidewall region and bead region of tire 500 is substantially the same as that of the tire 100, and is therefore not repeated. The alternative embodiments described with respect to tire 100 may also be applied to tire 500.

The tire 500 includes four circumferential belts 540a, 540b, 540c, 540d in the crown region 545, disposed above the body ply 535 and extending axially across a portion of the body ply 535. The belts 540 may be constructed of steel or any other metal.

The tire 500 further includes a shoulder 550 at each end of the crown region 545, only one of which is shown in FIG. 6. A belt wedge 560 is located in each shoulder 550, between an end of a second belt 540b and an end of a third belt 540c. A gum strip 565 is also located in each shoulder 550, above the ends of the second and third belts 540b,c.

In the illustrated embodiment, the tire 500 includes a single cap ply 570 disposed above each of the circumferential belts 540a,b,c,d. The cap ply 570 has a first end 575 located outside a first end of each of the first, third, and fourth circumferential belts 540a,c,d, but inside a first end of the second circumferential belt 540b. The cap ply 570 also has a second end (not shown in this view) located outside a second end of each of the first, third, and fourth circumferential belts 540a,c,d, but inside a second end of the second circumferential belt 540b. Such a cap ply may be referred to as a "mid-step" cap ply.

In one embodiment the cap ply 570 is constructed of nylon. In alternative embodiments, the cap ply 570 may be constructed of polyester, rayon, aramid, polyester-aramid mix, other synthetic fibers, or other such material. In yet another alternative embodiment, the cap ply 570 may be constructed of steel. The cap ply 570 is pre-tensioned during a tire build, in the same manner described above with respect to tire 100.

Although not shown in this embodiment, it should be understood that a two cap ply may also employ "mid-step" cap plies. Likewise, it should be understood that a single cap ply may be a "full cap" ply.

In each of the above-described embodiments, the cap plies and shoulder layers may be referred to as reinforcements, reinforcement layers, or reinforcement plies. It should be understood that additional embodiments may include any number of reinforcements. For example a tire may have one or more cap plies and one or more shoulder layers. Other such variations should be apparent to a person of ordinary skill in the art.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
a crown region;
a first shoulder region at a first end of the crown region;
a second shoulder region at a second end of the crown region;
a pair of bead regions, including a first bead region and a second bead region;
a first sidewall region extending from the first bead region to the first shoulder region;
a second sidewall region extending from the second bead region to the second shoulder region;
at least three circumferential belts disposed in the crown region, including a first circumferential belt, a second circumferential belt disposed above the first circumferential belt, and a third circumferential belt disposed above the second circumferential belt;
a first shoulder layer located in the first shoulder region and disposed above the at least three circumferential belts, wherein the first shoulder layer has a first outer end located outside a first end of at least two of the at least three circumferential belts and a first inner end located inside the first end of each of the at least three circumferential belts;
a first gum strip disposed above at least two of the at least three circumferential belts, wherein the first gum strip has a first outer end located outside the first end of each of the at least three circumferential belts, wherein the first gum strip does not contact a bottom surface of any circumferential belt, and wherein the first gum strip contacts the first end of the second circumferential belt;
a first belt wedge having a first inner end disposed radially between the first end of the second circumferential belt and the first end of the third circumferential belt, and wherein the first belt wedge is in contact with the first gum strip;
a second shoulder layer located in the second shoulder region and disposed above the at least three circumferential belts, wherein the second shoulder layer has a second outer end located outside a second end of at least two of the at least three circumferential belts and a second inner end located inside the second end of each of the at least three circumferential belts;
a second gum strip disposed above at least two of the at least three circumferential belts, wherein the second gum strip has a second outer end located outside the second end of each of the at least three circumferential belts, wherein the second gum strip does not contact a bottom surface of any circumferential belt, and wherein the second gum strip contacts the second end of the second circumferential belt; and a second belt wedge having a first inner end disposed radially between the second end of the second circumferential belt and the second end of the third circumferential belt; and wherein the second belt wedge is in contact with the second gum strip.

2. The tire of claim 1, wherein the first shoulder layer and the second shoulder layer are each constructed of steel.

3. The tire of claim 1, wherein the first shoulder layer and the second shoulder layer are both pretensioned, such that the first shoulder layer and the second shoulder layer are under tension when the tire is not in contact with a ground surface.

4. The tire of claim 1, wherein the first shoulder layer includes a first lower shoulder layer and a first upper shoulder layer disposed above the first lower shoulder layer, and wherein the second shoulder layer includes a second lower shoulder layer and a second upper shoulder layer disposed above the second lower shoulder layer.

5. The tire of claim 4, wherein the first lower shoulder layer, the first upper shoulder layer, the second lower shoulder layer, and the second upper shoulder layer are each constructed of steel.

6. The tire of claim 4, wherein the first lower shoulder layer, the first upper shoulder layer, the second lower shoulder layer, and the second upper shoulder layer are each constructed of nylon.

7. A tire comprising:

a pair of annular beads;

a body ply extending between the pair of annular beads;

at least three steel belt layers disposed above the body ply and extending axially across a portion of the body ply, the at least three steel belt layers including a first steel belt layer, a second steel belt layer disposed above the first steel belt layer, and a third steel belt layer disposed above the second steel belt layer;

a pair of gum strips above at least two of the at least three steel belt layers, wherein each gum strip has an outer end located outside each of the at least three steel belt layers, wherein each gum strip does not contact a bottom surface of any steel belt layer, and wherein each gum strip contacts an end of the second steel belt layer;

at least one reinforcement layer disposed above the at least three steel belt layers;

a circumferential tread disposed above the at least one reinforcement layer and extending axially across the tire;

a pair of sidewalls extending between each of the pair of annular beads and a pair of shoulders associated with the circumferential tread; and a pair of belt wedges, wherein each belt wedge has an inner end disposed radially between the second steel belt layer and the third steel belt layer, wherein each belt wedge is in contact with each gum strip.

8. The tire of claim 7 wherein the at least one reinforcement layer includes:

a first shoulder reinforcement layer, the first shoulder reinforcement layer having an outer end located outside a first end of each steel belt layer and an inner end located inside the first end of each steel belt layer; and a second shoulder reinforcement layer, the second shoulder reinforcement layer having an outer end located outside a second end of each steel belt layer and an inner end located inside the first end of each steel belt layer.

9. The tire of claim 8, wherein the first shoulder reinforcement layer includes a first upper reinforcement layer and a first lower reinforcement layer, and wherein the second shoulder reinforcement layer includes a second upper reinforcement layer and a second lower reinforcement layer.

10. The tire of claim 7, wherein the at least one reinforcement layer includes at least one cap ply having a first end located outside a first end of each steel belt layer and a second end located outside a second end of each steel belt layer.

11. The tire of claim 10, wherein the at least one cap ply includes an upper cap ply and a lower cap ply.

* * * * *